United States Patent [19]

Chen

[11] Patent Number: 5,330,302
[45] Date of Patent: Jul. 19, 1994

[54] WEDGE-NUT ASSEMBLY FOR FASTENING BICYCLE STEM TUBE IN STEERER TUBE

[75] Inventor: Chao F. Chen, Taichung Hsien, Taiwan

[73] Assignee: Kalloy Industrial Co., Ltd., Taiwan

[21] Appl. No.: 96,022

[22] Filed: Jul. 22, 1993

[51] Int. Cl.⁵ .................. F16B 13/04; F16B 37/08
[52] U.S. Cl. ................... 411/79; 411/432; 74/551.1
[58] Field of Search ............ 411/77, 79, 80, 55, 411/183, 427, 432; 74/551.1

[56] References Cited

U.S. PATENT DOCUMENTS

| | | | |
|---|---|---|---|
| 737,555 | 8/1903 | Dorn | 411/79 |
| 2,280,662 | 4/1942 | Pawsat | 411/79 X |
| 3,365,998 | 1/1968 | Zahodiakin | 411/183 X |
| 4,274,301 | 6/1981 | Katayama | 74/551.1 |
| 5,213,006 | 5/1993 | Liao | 74/551.1 |

*Primary Examiner*—Neill R. Wilson
*Attorney, Agent, or Firm*—Welsh & Katz, Ltd.

[57] ABSTRACT

A wedge-nut assembly including (a) a wedge with a tubular cross section including at least three radially inwardly convex portions longitudinally extending on an inner side thereof and a corresponding number of blocks projecting from the radially inwardly convex portions and (b) a nut including two annular flanges between which the blocks are disposed so that the nut is mounted in the tubular wedge.

1 Claim, 2 Drawing Sheets

WEDGE-NUT ASSEMBLY FOR FASTENING BICYCLE STEM TUBE IN STEERER TUBE

BACKGROUND OF INVENTION

1. Field of Invention

The present invention relates to a wedge-nut assembly for fastening a bicycle stem tube in a steerer tube.

2. Related Prior Art

A bicycle frame has a head tube. A steerer tube is inserted in the head tube. A wedge nut defining a threading is received in the steerer tube. A stem tube defining a wedge-shaped tip is inserted in the steerer tube. An adjusting bolt defining a threading is inserted through the stem tube so that the threading thereof is engaged with the threading formed in the wedge nut. The wedge-shaped tip of the stem tube engages with the wedge nut so as to transform axial relative movement therebetween into radial relative therebetween. When the threading formed on the bolt is secured in the threading formed in the wedge nut, the wedge nut is axially moved towards the stem tube, so that the wedge nut is radially moved away from the stem tube. Thus, the stem tube and the wedge nut are firmly retained in the steerer tube when they are pushed, by each other, against the steerer tube. However, the wedge nut is subjected to great stress. Therefore, the present is intended to solve the above-mentioned problem.

SUMMARY OF INVENTION

It is an object of the present invention to provide a wedge nut for fastening a bicycle stem tube in a steerer tube. The wedge-nut assembly includes (a) a wedge with a tubular cross section including at least three radially inwardly convex portions longitudinally extending on an inner side thereof and a corresponding number of blocks projecting from the radially inwardly convex portions and (b) a nut including two annular flanges between which the blocks are disposed so that the nut is mounted in the tubular wedge.

For a better understanding of the present invention and objects thereof, detailed description of the preferred embodiment thereof should be made in relation to the accompanying drawings.

DETAILED DESCRIPTION OF PREFERRED EMBODIMENT

Two wedge nuts in accordance with prior art will be described before the detailed description of the wedge-nut assembly in accordance with the present invention, so that the advantage of the present invention over prior art will be clearly understood.

A bicycle frame (not shown) has a head tube (not shown). A steerer tube (not shown) is inserted in the head tube. A wedge nut defining a threading is received in the steerer tube. A stem tube defining a wedge-shaped tip is inserted in the steerer tube. An adjusting bolt defining a threading is inserted through the stem tube so that the threading thereof is engaged with the threading formed in the wedge nut (see FIG. 3). The wedge-shaped tip of the stem tube engages with the wedge nut so as to transform axial relative movement therebetween into radial relative therebetween. When the threading formed on the bolt is secured in the threading formed in the wedge nut, the wedge nut is axially moved towards the stem tube, so that the wedge nut is radially moved away from the stem tube. Thus, the stem tube and the wedge nut are firmly retained in the steerer tube when they are pushed, by each other, against the steerer tube.

Figure 4:
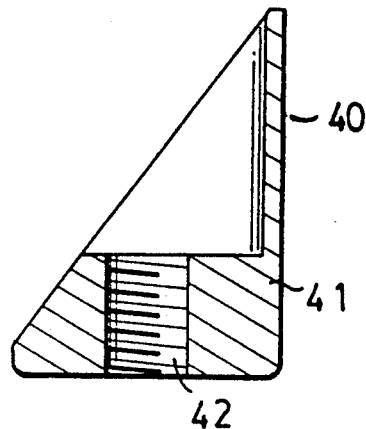
FIG. 4 is a cross-sectional view of a first type of wedge nut in accordance with prior art.

Referring to FIG. 4 of the drawings, a wedge nut 40 has a solid base 41 wherein a threading 42 is formed. If water leaks into the steerer tube, the bold base 41 keeps water in the steerer tube and, thus, the adjusting bolt may easily be rusted.

Figure 5:
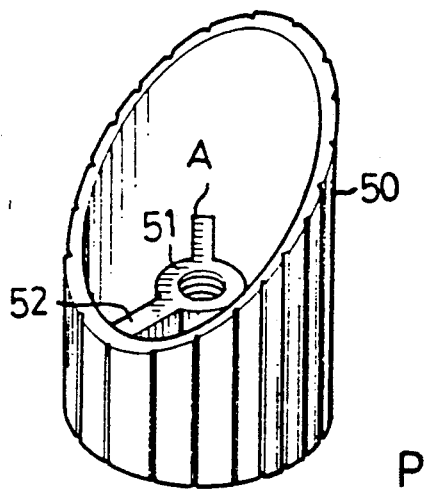
FIG. 5 is a perspective view of a second type of wedge nut in accordance with prior art.

Referring to FIG. 5 of the drawings, a wedge nut has a wedge 50 formed together with a nut 51 by means of three connecting portions 52. Such a wedge nut solves the above-mentioned problem. However, in use, each connecting portion 52 is subjected to great stress at a point A. The wedge 50, the nut 51 and the connecting portions 52 are formed as an extrusion of aluminum. A threading is drilled in the nut 51. If the drilling of the threading goes wrong, the whole wedge nut must be abandoned. This is a waste.

Figure 1:
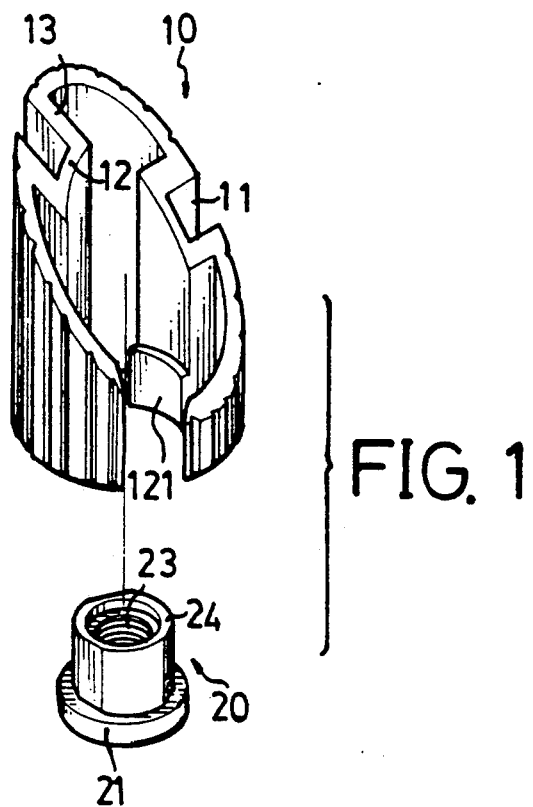
FIG. 1 is an exploded view of a wedge-nut assembly in accordance with the preferred embodiment of the present invention.

Referring to FIG. 1, a wedge-nut assembly includes a wedge 10 and a nut 20. The wedge 10 is formed as a tubular extrusion of metal, e.g., aluminum. The wedge 10 has several, e.g., three radially inwardly convex portions 12 longitudinally extending on an inner side thereof. Each radially inwardly convex portion 12 has a block 121 projecting therefrom. Each block 121 has an upper shoulder and a lower shoulder. The nut 20 is made of steel. A threading 23 is formed in the nut 20. An annular flange 21 is formed on a lower end of the nut 20. A tubular ridge 24 is formed on an upper end of the nut 20.

Figure 2:
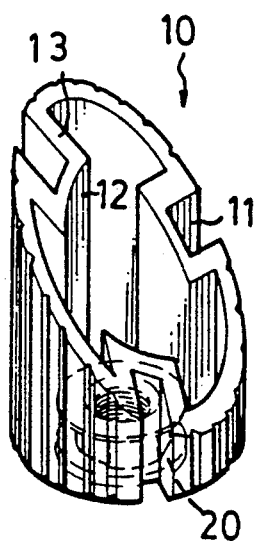
FIG. 2 is a perspective view of a wedge-nut assembly in accordance with the preferred embodiment of the present invention.

Referring to FIG. 2, the nut 20 is inserted in the wedge 10 so that the lower shoulders of the blocks 121 are engaged with the annular flange 21. The tubular ridge 24 is hammered so as to form an annular flange engaged with the upper shoulders of the blocks 121. The nut 20 is mounted in the wedge 10.

Figure 3:
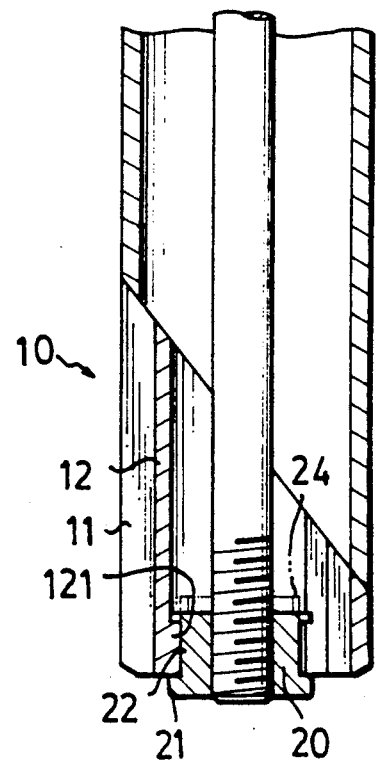
FIG. 3 is a cross-sectional view of a wedge-nut assembly in accordance with the preferred embodiment of the present invention.

Referring to FIG. 3 of the drawings, a wedge-shaped end of a stem tube is engaged with the wedge 10. An adjusting bolt defining a threading is inserted through the stem tube and the wedge 10 so that the threading formed on the adjusting bolt is engaged with the threading 23.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A wedge-nut assembly comprising:
   a wedge with a tubular cross section, comprising at least three radially inwardly convex portions longitudinally extending on an inner side thereof and a corresponding number of blocks projecting from the radially inwardly convex portions; and
   a nut comprising two annular flanges between which the blocks are disposed so that the nut is mounted in the tubular wedge.

* * * * *